(12) United States Patent
Xue et al.

(10) Patent No.: US 11,965,480 B2
(45) Date of Patent: Apr. 23, 2024

(54) SYSTEM AND METHOD FOR MONITORING HEALTH STATE OF OFFSHORE WIND POWER WIND TURBINE AND SOUND WAVES OF SEA WAVES

(71) Applicant: OCEAN UNIVERSITY OF CHINA, Qingdao (CN)

(72) Inventors: Sidney Yu Xue, Qingdao (CN); Yuanzhen Cui, Qingdao (CN); Yang Zhang, Qingdao (CN)

(73) Assignee: OCEAN UNIVERSITY OF CHINA, Qingdao (CN)

( * ) Notice: Subject to any disclaimer, the term of this patent is extended or adjusted under 35 U.S.C. 154(b) by 0 days.

(21) Appl. No.: 17/797,724

(22) PCT Filed: Jan. 18, 2021

(86) PCT No.: PCT/CN2021/072469
§ 371 (c)(1),
(2) Date: Aug. 5, 2022

(87) PCT Pub. No.: WO2021/159919
PCT Pub. Date: Aug. 19, 2021

(65) Prior Publication Data
US 2023/0075281 A1 Mar. 9, 2023

(30) Foreign Application Priority Data
Feb. 10, 2020 (CN) .......................... 202010085209.8

(51) Int. Cl.
*F03D 17/00* (2016.01)

(52) U.S. Cl.
CPC ........ *F03D 17/00* (2016.05); *F05B 2270/334* (2013.01)

(58) Field of Classification Search
CPC ...... F03D 17/00; F03D 17/012; F03D 17/022; F03D 17/024; F03D 17/0285;
(Continued)

(56) References Cited

U.S. PATENT DOCUMENTS

2015/0159632 A1\* 6/2015 Vangen ..................... F03D 7/04
416/61

FOREIGN PATENT DOCUMENTS

| CN | 204458220 U | * | 7/2015 | |
|---|---|---|---|---|
| CN | 110005581 A | * | 7/2019 | ............. F03D 17/00 |

\* cited by examiner

*Primary Examiner* — Justin D Seabe
*Assistant Examiner* — John S Hunter, Jr.
(74) *Attorney, Agent, or Firm* — Bayramoglu Law Offices LLC

(57) ABSTRACT

An acoustic monitoring system and method for the health status of an offshore wind turbine and an ocean wave are provided. The acoustic monitoring system includes a first laser transmitter, a second laser transmitter, a telephoto camera provided at a hub, a vibration detection sensor provided on a tower of a wind turbine, and four acoustic detection sensors arranged at an interval of 90° along the circumference of the tower. The first and second laser transmitters are arranged at the bottom of a nacelle of the wind turbine and emit laser lights vertically downward. The first laser transmitter, the second laser transmitter, the telephoto camera, the vibration detection sensor, and the acoustic detection sensors are connected to a data acquisition and conversion module through a transmission module. The acoustic monitoring system combines laser light detection with acoustic signal feature detection to improve stability and safety of the offshore wind turbine.

10 Claims, 7 Drawing Sheets

(58) Field of Classification Search
CPC ............ F05B 2270/334; F05B 2270/33; F05B 2270/8041; F05B 2270/8042; F05B 2270/81
See application file for complete search history.

SYSTEM AND METHOD FOR MONITORING HEALTH STATE OF OFFSHORE WIND POWER WIND TURBINE AND SOUND WAVES OF SEA WAVES

CROSS REFERENCE TO THE RELATED APPLICATIONS

This application is the national phase entry of International Application No. PCT/CN2021/072469, filed on Jan. 18, 2021, which is based upon and claims priority to Chinese Patent Application No. 202010085209.8, filed on Feb. 10, 2020, the entire contents of which are incorporated herein by reference.

TECHNICAL FIELD

The present disclosure belongs to the field of offshore wind turbines and, in particular, relates to an acoustic monitoring system and method for the health status of an offshore wind turbine and an ocean wave.

BACKGROUND

Traditional safety monitoring of the blades of a wind turbine relies on a telephoto camera provided at a hub to acquire the movement forms of the blades and then analyzes the shape of the blades in the image to determine a fault problem. This method has high requirements on the camera performance and is unclear and subjective for fault analysis. When a fault occurs, the method cannot accurately locate the faulty blade, which increases the difficulty of operation and maintenance.

SUMMARY

A technical problem to be solved by the present disclosure is to provide an acoustic monitoring system and method for the health status of an offshore wind turbine and an ocean wave.

The present disclosure adopts the following technical solutions:

An acoustic monitoring system for the health status of an offshore wind turbine and an ocean wave includes a first laser transmitter and a second laser transmitter, which are arranged at the bottom of a nacelle of a wind turbine and emit laser lights vertically downward, a telephoto camera provided at a hub, a vibration detection sensor provided on a tower of the wind turbine, and four acoustic detection sensors arranged at an interval of 90° along the circumference of the tower. The first laser transmitter, the second laser transmitter, the telephoto camera, the vibration detection sensor, and the acoustic detection sensors are connected to a data acquisition and conversion module through a transmission module. A controller is connected to the data acquisition and conversion module and is configured to control operations of the first laser transmitter, the second laser transmitter, the telephoto camera, the vibration detection sensor, and the acoustic detection sensors. A data display terminal is connected to the controller.

Further, the distance between the laser light emitted by the first laser transmitter and the tower of the wind turbine may be 6 m, and the distance between the laser light emitted by the second laser transmitter and the tower of the wind turbine may be 3 m.

Further, the blade tips of the wind turbine may be coated with different smooth color coatings.

Further, the acoustic detection sensors may be micro-signal stethoscopes.

Further, four acoustic detection sensors may be further arranged at an interval of 90° along the circumference of a pile foundation of the wind turbine, and the acoustic detection sensors may employ the micro-signal stethoscopes.

Further, the acoustic monitoring system may include an acoustic emission apparatus provided at the position where projection of the blade tip of the wind turbine is located on the tower. The acoustic emission apparatus may be connected to a control center through a central processing unit and an execution device. The acoustic emission apparatus may include an acoustic emission sensor and an acoustic wave sensor. The central processing unit may include an acquisition and operation module, a safety monitoring module, and a mapping configuration module.

An acoustic monitoring method for the health status of an offshore wind turbine and an ocean wave uses the aforementioned acoustic monitoring system and has the following improvements. When a blade touches the laser light of the first laser transmitter during the operation of the wind turbine, the controller activates the micro-signal stethoscopes to acquire and send an acoustic signal of the blade movement to the controller. The controller locates a blade fault type according to a built-in blade fault diagnosis algorithm and determines whether the wind turbine needs to be shut down for troubleshooting. When the blade is increasingly deformed and touches the laser light of the second laser transmitter, the controller activates the telephoto camera to shoot a shape of the blade and determines whether the wind turbine needs to be shut down to protect the blade according to the level of damage to the blade. In addition, the blade with a large deformation is determined by the laser lights which are emitted by the first laser transmitter and the second laser transmitter and reflected with different color spectra by the different color coatings at the blade tips. The vibration detection sensor detects a vibration signal of the tower of the wind turbine, transmits the vibration signal to the controller in real time, and triggers an alarm to stop the wind turbine if the vibration distance of the tower exceeds a set value.

Further, the movement of the blade tip in a measurement zone is observed. The corresponding distances from the blade tip to various positions of the tower and corresponding acoustic signals generated by the movement of the blade tip are acquired. A distance is selected as a minimum safe distance from the various distances. An acoustic signal corresponding to the minimum safe distance is taken as a warning acoustic value. The acoustic emission apparatus detects a real-time acoustic signal generated when the blade tip moves to the measurement zone during the operation of the wind turbine. The operational safety status of the wind turbine is monitored based on the real-time acoustic signal and the warning acoustic value. If the real-time acoustic signal is greater than the warning acoustic value, a warning signal is sent to the remote control center and the execution device of the wind turbine. If the real-time acoustic signal is not greater than the warning acoustic value, the blade will not collide with the tower, hitting of an ocean wave on the pile foundation after breaking has a small effect on a load, and hitting of an ocean current has a small effect on the pile foundation.

Further, the movement of the ocean wave on the sea surface where the wind turbine is located is observed. Hitting and breaking acoustic signals generated by the ocean wave at the tower and the sea surface after hitting the pile foundation are acquired. An acoustic signal corresponding to a maximum load generated when a maximum ocean wave hits the pile foundation is selected as a warning acoustic value. A buoy-type acoustic emission apparatus is mounted at the sea surface. The load operational safety status of the pile foundation of the wind turbine is monitored based on the real-time acoustic signal and the warning acoustic value.

Further, the movement of the ocean current below the sea surface where the wind turbine is located is observed, and an acoustic signal of the pile foundation is acquired. An acoustic signal corresponding to a maximum load generated when a maximum ocean current flows through the pile foundation is selected as a warning acoustic value. An acoustic emission apparatus is mounted at a corresponding position below the sea surface. The load operational safety status of the pile foundation of the wind turbine is monitored based on the real-time acoustic signal and the warning acoustic value.

The present disclosure has the following advantages.

In the present disclosure, in view of different load environments in which the offshore wind turbine operates, the acoustic monitoring system for the health status of the offshore wind turbine and the ocean wave combines laser light detection with acoustic signal feature detection to improve the stability and safety of the offshore wind turbine. The four acoustic detection sensors arranged at the interval of 90° can effectively detect the noise of the wind turbine when the wind turbine yaws.

In the present disclosure, compared with the conventional method, the acoustic monitoring method for the health status of the offshore wind turbine and the ocean wave does not require a high-precision telephoto camera. The telephoto camera is merely used as an auxiliary detection tool and is only activated to target fault location when the acoustic signal detection fails and the maximum safe distance X2 is reached (that is, the blade touches the laser light of the second laser transmitter).

In the present disclosure, the acoustic monitoring method for the health status of the offshore wind turbine and the ocean wave reduces the probability of the blade tip colliding with the tower caused by the twisting of the blade under strong wind conditions to improve safety. The load fluctuation is monitored by monitoring the hitting of ocean waves and ocean currents on the load of the pile foundation of the tower to improve safety.

DETAILED DESCRIPTION OF THE EMBODIMENTS

To make the objectives, technical solutions, and advantages of the present disclosure clearer, the present disclosure is described in further detail below with reference to the drawings and embodiments. The described specific embodiments are merely used to explain the present disclosure, rather than to limit the present disclosure.

Figure 1:
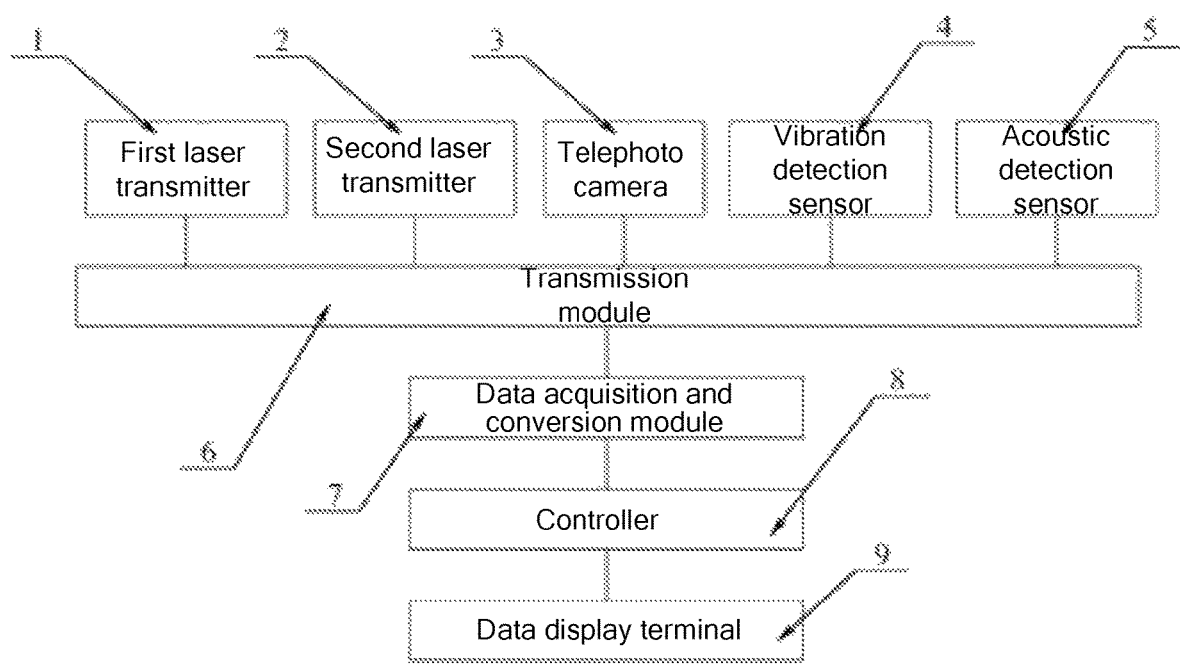
FIG. 1 is a block diagram of an acoustic monitoring system according to Embodiment 1 of the present disclosure.
Figure 2:
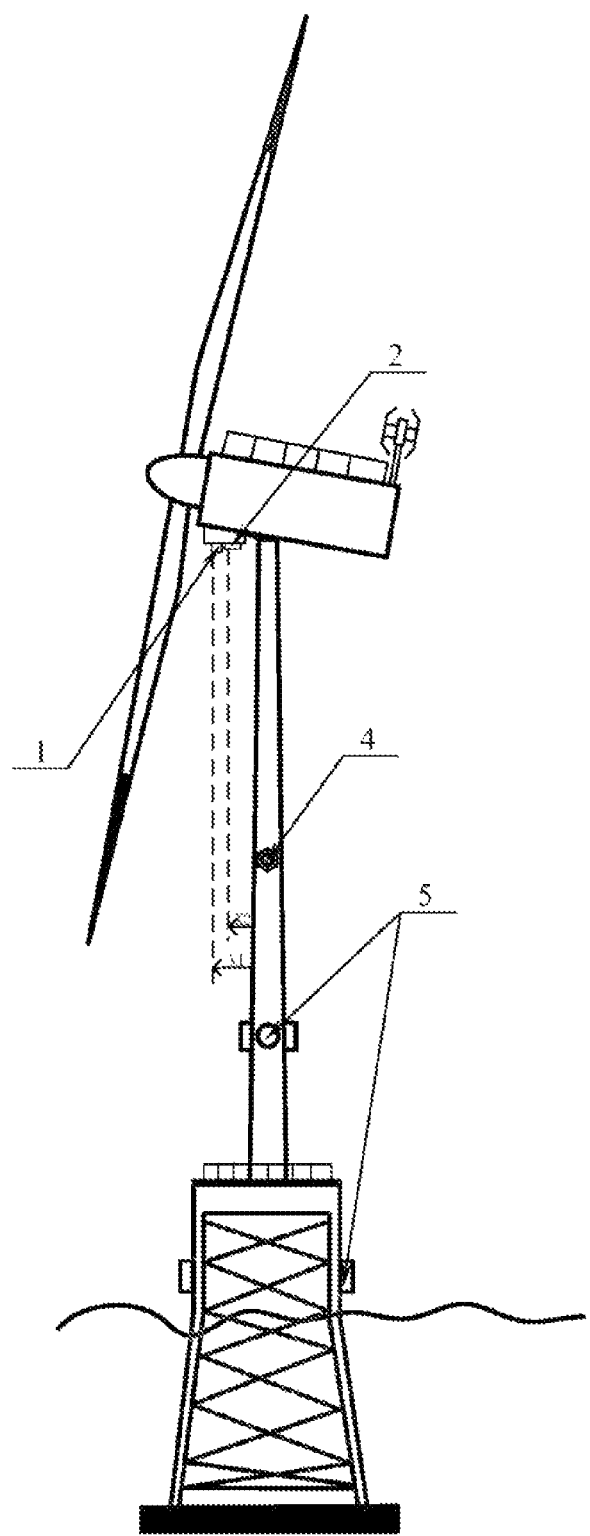
FIG. 2 shows the mounting positions of the acoustic monitoring system on a wind turbine according to Embodiment 1 of the present disclosure.
Figure 3:
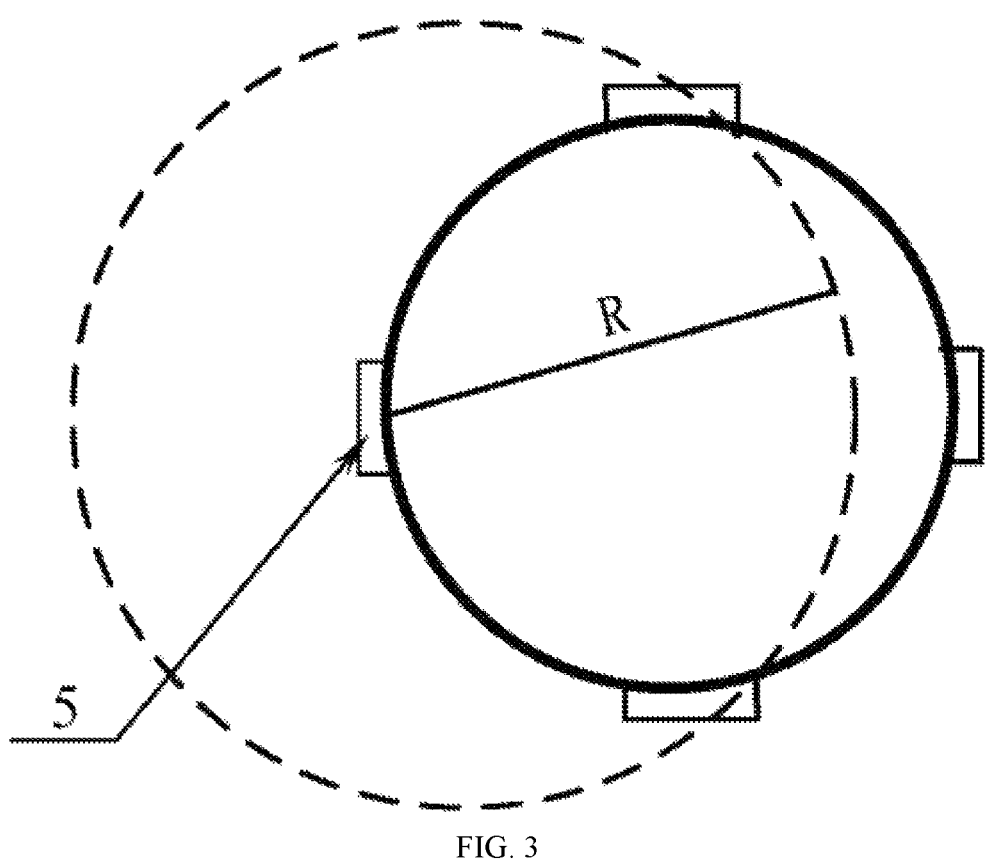
FIG. 3 shows the mounting positions and the detection radius of acoustic detection sensors in the acoustic monitoring system according to Embodiment 1 of the present disclosure.

Embodiment 1 of the present disclosure provides an acoustic monitoring system for the health status of an offshore wind turbine and an ocean wave. As shown in FIGS. 1 and 2, the acoustic monitoring system includes a first laser transmitter 1 and a second laser transmitter 2, which are arranged at the bottom of a nacelle of a wind turbine and emit laser lights vertically downward, a telephoto camera 3 provided at a hub, a vibration detection sensor 4 provided on a tower of the wind turbine, and four acoustic detection sensors 5 arranged at an interval of 90° along the circumference of the tower, as shown in FIG. 3. The wind farm survey shows that the different detection positions of the sensors will affect the acquisition of aerodynamic signals of the impellers. In FIG. 3, the acoustic detection sensor has a detection radius of R. The first laser transmitter, the second laser transmitter, the telephoto camera, the vibration detection sensor, and the acoustic detection sensors are connected to data acquisition and conversion module 7 through a transmission module 6. A controller 8 is connected to the data acquisition and conversion module and is configured to control operations of the first laser transmitter, the second laser transmitter, the telephoto camera, the vibration detection sensor, and the acoustic detection sensors. A data display terminal 9 is connected to the controller. The data display terminal is mainly a QT-based graphical interface operating system, which can observe operational safety and health data of the wind turbine in real time.

Figure 4:
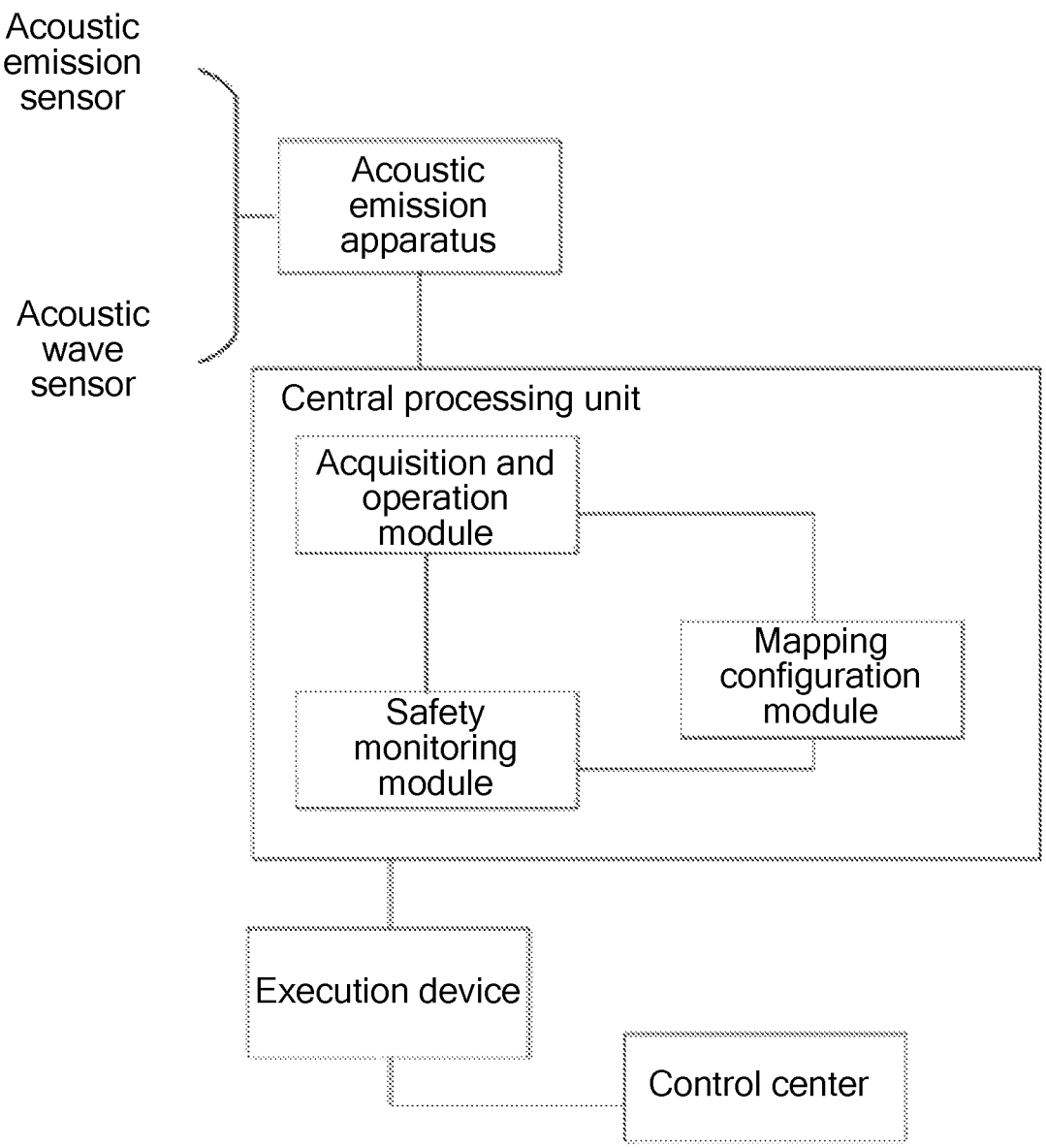
FIG. 4 shows the connection relationships of an acoustic emission apparatus and related components in the acoustic monitoring system according to Embodiment 1 of the present disclosure.

In this embodiment, the distance between the laser light emitted by the first laser transmitter and the tower of the wind turbine is 6 m, and the distance between the laser light emitted by the second laser transmitter and the tower of the wind turbine is 3 m. Blade tips of the wind turbine are coated with different smooth color coatings. The acoustic detection sensors are micro-signal stethoscopes, which are key devices for acquiring acoustic signals of the blade tips. Compared with traditional microphone sensors, the acoustic detection sensors can more effectively acquire the aerodynamic noise of the wind turbine at a low wind speed and can obtain clearer sound, which is easy for signal analysis. Four acoustic detection sensors 5 are further arranged at an interval of 90° along the circumference of a pile foundation of the wind turbine, and the acoustic detection sensors employ the micro-signal stethoscopes. The acoustic monitoring system further includes an acoustic emission apparatus provided at the position where projection of the blade tip of the wind turbine is located on the tower. As shown in FIG. 4, the acoustic emission apparatus is connected to a control center through a central processing unit and an execution device. The acoustic emission apparatus includes an acoustic emission sensor and an acoustic wave sensor. The central processing unit includes an acquisition and operation module, a safety monitoring module, and a mapping configuration module.

This embodiment further provides an acoustic monitoring method for the health status of an offshore wind turbine and an ocean wave, which uses the aforementioned acoustic monitoring system to detect the safety status of the wind turbine and blades, acquire fault information, and analyze the influence of aerodynamic and hydrodynamic loads on the stability of the tower of the wind turbine.

The acoustic monitoring method specifically includes the steps that are described as follows. The first laser transmitter and the second laser transmitter each emit laser lights during the operation of the wind turbine. When the blade fails or the load increases, the distance between the blade and the tower of the wind turbine decreases. When the distance is less than a set first safe distance $X1=6$ m (that is, when the blade touches the laser light of the first laser transmitter), the controller activates the micro-signal stethoscopes to acquire and send an acoustic signal of blade movement to the controller. The controller locates a blade fault type according to a built-in blade fault diagnosis algorithm and determines whether the wind turbine needs to be shut down for troubleshooting. When the blade is increasingly deformed and touches the laser light of the second laser transmitter (that is, the distance is less than a set minimum safe distance $X2=3$ m), the controller activates the telephoto camera to shoot a shape of the blade and determines whether the wind turbine needs to be shut down to protect the blade according to the level of damage to the blade. The telephoto camera is mainly configured to further determine the noise problem and noise blade in combination with the stethoscopes, such that the targeted maintenance is carried out. The laser light emitted by the laser transmitter is blocked and reflected by the blade to determine whether the blade reaches a safe distance. In addition, the blade with large deformation can also be determined by the laser lights which are emitted by the first laser transmitter and the second laser transmitter and reflected with different color spectra by the different color coatings at the blade tips to carry out targeted troubleshooting.

Figure 5:
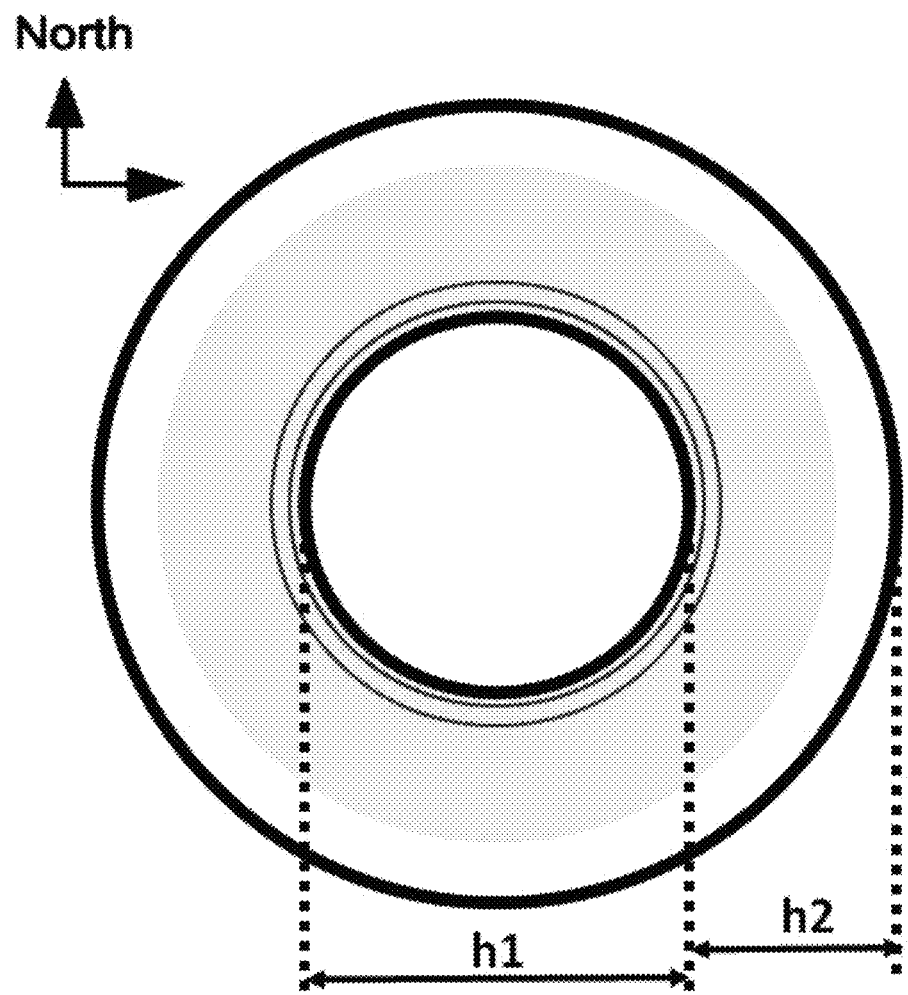
FIG. 5 shows a vibration range of a tower.

The vibration detection of the tower of the wind turbine is used mainly to detect the impact on the overall wind turbine caused by the large change of the incoming wind speed or the large load of the ocean wave fluid. If the incoming wind speed changes greatly, the pitch of the wind turbine will lag, and the aerodynamic load on the wind turbine will increase, resulting in obvious vibration and shaking of the tower of the wind turbine. At this time, the vibration detection sensor detects the vibration signal of the tower of the wind turbine and transmits the vibration signal to the controller in real time. As shown in FIG. 5, the controller is provided with processing data displayed in the form of a vibration spectrum (the level of vibration is continuously enhanced from inside to outside), which can be displayed on a display screen in real time. The tower of the wind turbine has a diameter of h1, and a maximum tilt vibration of h2 is initially set to 5 cm. If the vibration distance of the tower exceeds h2, an alarm will be triggered to stop the wind turbine to protect the tower from damage in time.

Figure 6:
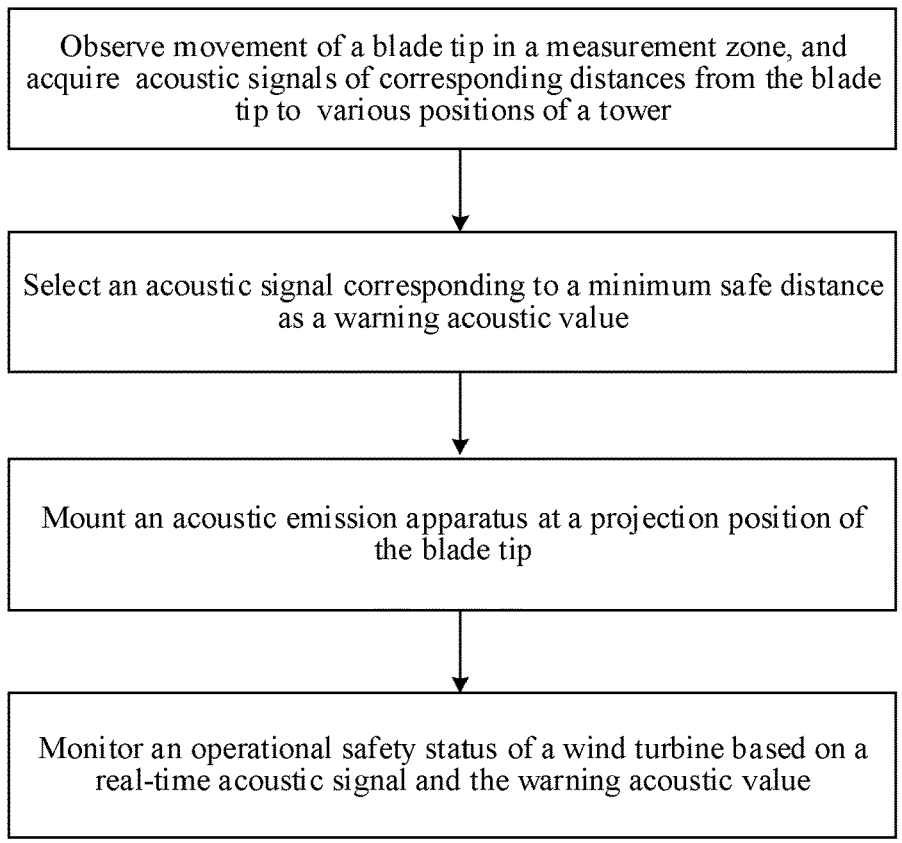
FIG. 6 is a flowchart of monitoring a blade tip by an acoustic monitoring method according to Embodiment 1 of the present disclosure.
Figure 7:
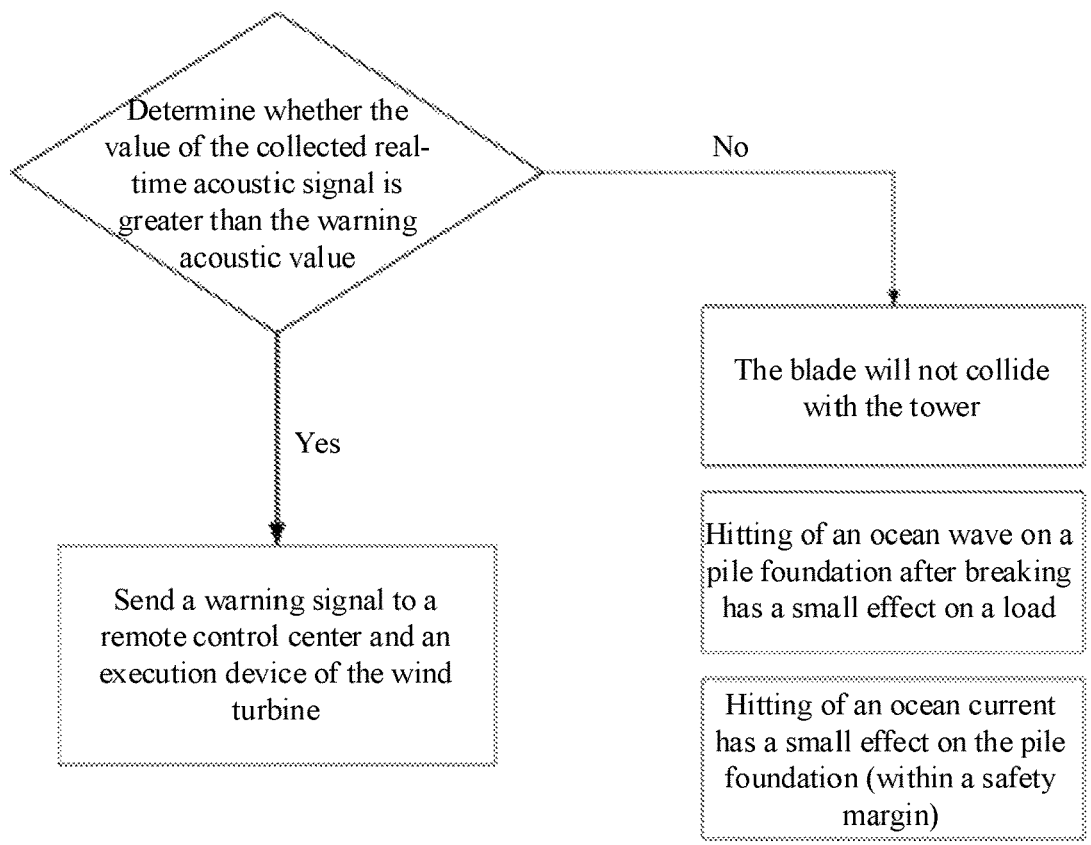
FIG. 7 is a flowchart of monitoring the operational safety status of the wind turbine by the acoustic monitoring method according to Embodiment 1 of the present disclosure.

As shown in FIGS. 6 and 7, the movement of the blade tip in a measurement zone is observed. The corresponding distances from the blade tip to various positions of the tower and corresponding acoustic signals generated by the movement of the blade tip are acquired. A distance is selected as a minimum safe distance from the various distances. An acoustic signal corresponding to the minimum safe distance is taken as a warning acoustic value. The acoustic emission apparatus detects a real-time acoustic signal generated when the blade tip moves to the measurement zone during the operation of the wind turbine. The operational safety status of the wind turbine is monitored based on the real-time acoustic signal and the warning acoustic value. If the real-time acoustic signal is greater than the warning acoustic value, a warning signal is sent to the remote control center and the execution device of the wind turbine. If the real-time acoustic signal is not greater than the warning acoustic value, the blade will not collide with the tower, hitting of an ocean wave on the pile foundation after breaking has a small effect on a load, and hitting of an ocean current has a small effect on the pile foundation.

Figure 8:
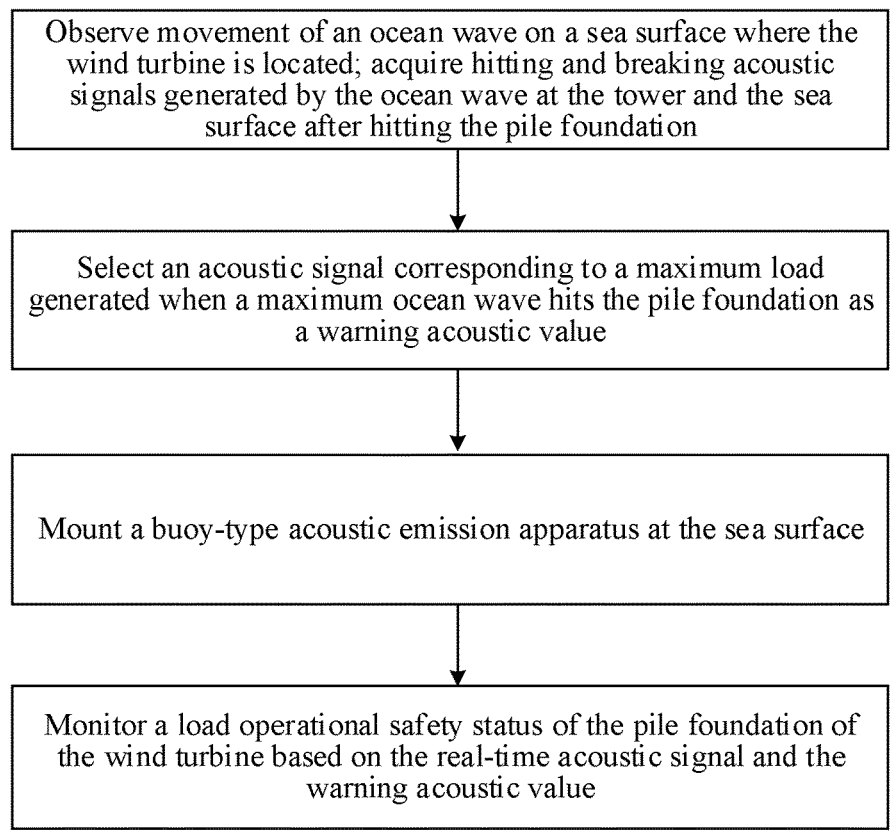
FIG. 8 is a flowchart of observing the movement of an ocean wave on a sea surface by the acoustic monitoring method according to Embodiment 1 of the present disclosure.

As shown in FIG. 8, the movement of the ocean wave on the sea surface where the wind turbine is located is observed. Hitting and breaking acoustic signals generated by the ocean wave at the tower and the sea surface after hitting the pile foundation are acquired. An acoustic signal corresponding to a maximum load generated when a maximum ocean wave hits the pile foundation is selected as a warning acoustic value. A buoy-type acoustic emission apparatus is mounted at the sea surface. The load operational safety status of the pile foundation of the wind turbine is monitored based on the real-time acoustic signal and the warning acoustic value.

Figure 9:
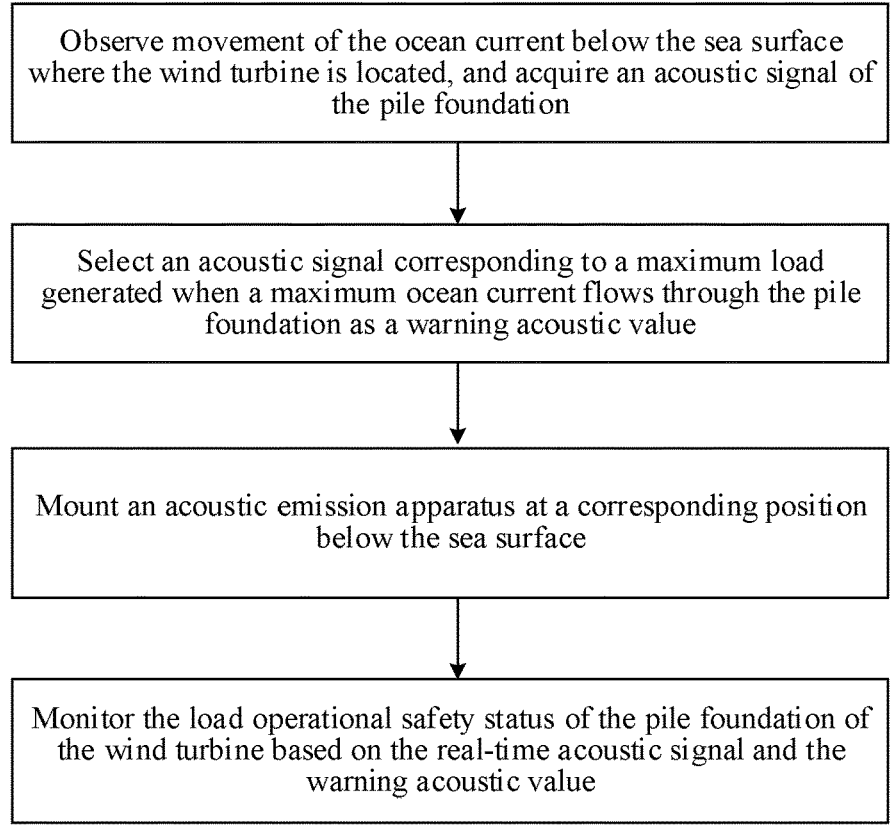
FIG. 9 is a flowchart of observing the movement of an ocean current below the sea surface by the acoustic monitoring method according to Embodiment 1 of the present disclosure.

As shown in FIG. 9, the movement of the ocean current below the sea surface where the wind turbine is located is observed, and an acoustic signal of the pile foundation is acquired. An acoustic signal corresponding to a maximum load generated when a maximum ocean current flows through the pile foundation is selected as a warning acoustic value. An acoustic emission apparatus is mounted at a corresponding position below the sea surface. The load operational safety status of the pile foundation of the wind turbine is monitored based on the real-time acoustic signal and the warning acoustic value.

What is claimed is:

1. An acoustic monitoring system for a health status of an offshore wind turbine and an ocean wave, the system comprising:
    a first laser transmitter;
    a second laser transmitter;
    a telephoto camera provided at a hub;
    a vibration detection sensor provided on a tower of a wind turbine; and
    four first acoustic detection sensors arranged at an interval of 90° along a circumference of the tower,
    wherein the first laser transmitter and the second laser transmitter are arranged at a bottom of a nacelle of the wind turbine and emit laser lights vertically downward; the first laser transmitter, the second laser transmitter, the telephoto camera, the vibration detection sensor, and the four first acoustic detection sensors are connected to a data acquisition and conversion module through a transmission module; a controller is connected to the data acquisition and conversion module and is configured to control operations of the first laser transmitter, the second laser transmitter, the telephoto camera, the vibration detection sensor, and the four first acoustic detection sensors; and a data display terminal is connected to the controller.

2. The acoustic monitoring system for the health status of the offshore wind turbine and the ocean wave according to claim 1, wherein a distance between a laser light emitted by the first laser transmitter and the tower of the wind turbine is 6 m, and a distance between a laser light emitted by the second laser transmitter and the tower of the wind turbine is 3 m.

3. The acoustic monitoring system for the health status of the offshore wind turbine and the ocean wave according to claim 2, wherein blade tips of the wind turbine are coated with different color coatings.

4. The acoustic monitoring system for the health status of the offshore wind turbine and the ocean wave according to claim 3, wherein the four first acoustic detection sensors are micro-signal stethoscopes.

5. The acoustic monitoring system for the health status of the offshore wind turbine and the ocean wave according to claim 4, wherein four second acoustic detection sensors are further arranged at an interval of 90° along a circumference of a pile foundation of the wind turbine, and the four second acoustic detection sensors employ the micro-signal stethoscopes.

6. The acoustic monitoring system for the health status of the offshore wind turbine and the ocean wave according to claim 5, the system further comprising:
a first acoustic emission apparatus provided at a position where projection of the blade tip of the wind turbine is located on the tower, wherein the first acoustic emission apparatus is connected to a remote control center through a central processing unit and an execution device, the first acoustic emission apparatus comprises an acoustic emission sensor and an acoustic wave sensor; and the central processing unit comprises an acquisition and operation module and a safety monitoring module.

7. An acoustic monitoring method for a health status of an offshore wind turbine and an ocean wave using the acoustic monitoring system according to claim 6, the method comprising:
when a blade touches the laser light of the first laser transmitter during an operation of the wind turbine, activating, by the controller, the micro-signal stethoscopes to acquire and send an acoustic signal of blade movement to the controller;
when the blade is increasingly deformed and touches the laser light of the second laser transmitter, activating, by the controller, the telephoto camera to shoot a shape of the blade, and determining whether the wind turbine needs to be shut down to protect the blade according to a level of damage to the blade;
the acoustic monitoring method further comprises: determining the blade with a large deformation by the laser lights, wherein the laser lights are emitted by the first laser transmitter and the second laser transmitter and reflected with different color spectra by the different smooth color coatings at the blade tips; and
the acoustic monitoring method further comprises: detecting, by the vibration detection sensor, a vibration signal of the tower of the wind turbine, transmitting the vibration signal to the controller in real time, and triggering an alarm to stop the wind turbine when a vibration distance of the tower exceeds a set value.

8. The acoustic monitoring method for the health status of the offshore wind turbine and the ocean wave according to claim 7, wherein
a movement of the blade tip in a measurement zone is observed; corresponding distances from the blade tip to various positions of the tower and corresponding acoustic signals generated by the movement of the blade tip are acquired;
a distance is selected as a minimum safe distance from various distances;
an acoustic signal corresponding to the minimum safe distance is taken as a first warning acoustic value; the first acoustic emission apparatus detects a real-time acoustic signal generated when the blade tip moves to the measurement zone during the operation of the wind turbine;
an operational safety status of the wind turbine is monitored based on the real-time acoustic signal and the first warning acoustic value;
when the real-time acoustic signal is greater than the first warning acoustic value, a warning signal is sent to the remote control center and the execution device of the wind turbine;
when the real-time acoustic signal is less than or equal to the first warning acoustic value, the blade does not collide with the tower, hitting of an ocean wave on the pile foundation after breaking has a pre-determined effect on a load, and hitting of an ocean current has a pre-determined effect on the pile foundation.

9. The acoustic monitoring method for the health status of the offshore wind turbine and the ocean wave according to claim 8, wherein
a movement of the ocean wave on a sea surface where the wind turbine is located is observed;
hitting and breaking acoustic signals generated by the ocean wave at the tower and the sea surface after hitting the pile foundation are acquired;
an acoustic signal corresponding to a maximum load generated when a maximum ocean wave hits the pile foundation is selected as a second warning acoustic value;
a buoy-type acoustic emission apparatus is mounted at the sea surface; and
a load operational safety status of the pile foundation of the wind turbine is monitored based on the real-time acoustic signal and the second warning acoustic value.

10. The acoustic monitoring method for the health status of the offshore wind turbine and the ocean wave according to claim 9, wherein
a movement of the ocean current below the sea surface where the wind turbine is located is observed, and an acoustic signal of the pile foundation is acquired;
an acoustic signal corresponding to a maximum load generated when a maximum ocean current flows through the pile foundation is selected as a third warning acoustic value;
a second acoustic emission apparatus is mounted at a corresponding position below the sea surface; and
the load operational safety status of the pile foundation of the wind turbine is monitored based on the real-time acoustic signal and the third warning acoustic value.

* * * * *